US008375333B2

(12) United States Patent
Kang et al.

(10) Patent No.: US 8,375,333 B2
(45) Date of Patent: Feb. 12, 2013

(54) MOBILE TERMINAL AND OPERATING METHOD THEREOF

(75) Inventors: Min Hun Kang, Seoul (KR); Se Il Hwang, Seoul (KR); Tae Kon Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 511 days.

(21) Appl. No.: 12/410,000

(22) Filed: Mar. 24, 2009

(65) Prior Publication Data

US 2010/0107046 A1 Apr. 29, 2010

(30) Foreign Application Priority Data

Oct. 27, 2008 (KR) ........................ 10-2008-0105473

(51) Int. Cl.
*G06F 3/048* (2006.01)
(52) U.S. Cl. ........ 715/838; 715/769; 715/760; 715/206; 715/207; 345/173; 709/245; 709/219
(58) Field of Classification Search .................. 715/769, 715/760, 206, 207, 838; 709/245, 219; 345/173
See application file for complete search history.

(56) References Cited

U.S. PATENT DOCUMENTS

| | | | | | |
|---|---|---|---|---|---|
| 5,918,237 | A | * | 6/1999 | Montalbano ................... | 715/206 |
| 5,945,989 | A | * | 8/1999 | Freishtat et al. .............. | 715/760 |
| 6,075,535 | A | * | 6/2000 | Fitzhugh et al. .............. | 715/700 |
| 7,797,641 | B2 | * | 9/2010 | Karukka et al. .............. | 715/802 |
| 2006/0050337 | A1 | * | 3/2006 | Hitaka et al. .................. | 358/537 |
| 2007/0143669 | A1 | * | 6/2007 | Royer ........................... | 715/523 |
| 2007/0150810 | A1 | * | 6/2007 | Katz et al. ..................... | 715/526 |
| 2007/0245300 | A1 | * | 10/2007 | Chan et al. .................... | 717/105 |
| 2008/0052945 | A1 | * | 3/2008 | Matas et al. ................... | 34/173 |
| 2008/0126952 | A1 | * | 5/2008 | Shohfi et al. .................. | 715/752 |
| 2008/0168396 | A1 | * | 7/2008 | Matas et al. ................... | 715/840 |
| 2008/0168403 | A1 | * | 7/2008 | Westerman et al. .......... | 715/863 |
| 2008/0215996 | A1 | * | 9/2008 | Vega et al. ..................... | 715/760 |
| 2008/0282196 | A1 | * | 11/2008 | Park .............................. | 715/838 |
| 2008/0284689 | A1 | * | 11/2008 | Kim et al. ...................... | 345/76 |
| 2008/0288886 | A1 | * | 11/2008 | Sherwood et al. ............ | 715/772 |
| 2008/0297484 | A1 | * | 12/2008 | Park et al. ..................... | 345/173 |
| 2009/0093275 | A1 | * | 4/2009 | Oh et al. ........................ | 455/566 |
| 2009/0150792 | A1 | * | 6/2009 | Laakso et al. ................. | 715/738 |
| 2009/0199106 | A1 | * | 8/2009 | Jonsson et al. ................ | 715/744 |
| 2009/0228841 | A1 | * | 9/2009 | Hildreth ........................ | 715/863 |
| 2010/0050068 | A1 | * | 2/2010 | Usami ........................... | 715/206 |
| 2010/0097322 | A1 | * | 4/2010 | Hu et al. ....................... | 345/173 |
| 2010/0103118 | A1 | * | 4/2010 | Townsend et al. ............ | 345/173 |
| 2010/0107046 | A1 | * | 4/2010 | Kang et al. ................... | 715/207 |
| 2010/0164992 | A1 | * | 7/2010 | Akiya ........................... | 345/641 |
| 2010/0259561 | A1 | * | 10/2010 | Forutanpour et al. ......... | 345/660 |

\* cited by examiner

OTHER PUBLICATIONS

"Tracking Web History 1/3" (MHL08-743). LG Electronics Inc., Jan. 12, 2009.

*Primary Examiner* — Steven Sax
*Assistant Examiner* — David Choi
(74) *Attorney, Agent, or Firm* — Birch, Stewart, Kolasch & Birch, LLP

(57) ABSTRACT

A mobile terminal and an operating method thereof are provided. The operating method includes bookmarking a plurality of websites using a touch screen of the mobile terminal, and storing a plurality of images respectively corresponding to the bookmarked plurality of websites; displaying on the touch screen an image array including the stored plurality of images in such a manner to create a sense of distance; and if a drag signal is input via a touch screen, changing at least one of the sizes of the images in the image array, at least one image in the image array, and an arrangement of the images in the image array, according to a direction and distance corresponding to the input drag signal. Therefore, it is possible to easily access and manage bookmarked websites.

18 Claims, 11 Drawing Sheets

MOBILE TERMINAL AND OPERATING METHOD THEREOF

CROSS-REFERENCE TO RELATED APPLICATION

This application claims priority from Korean Patent Application No. 10-2008-0105473, filed on Oct. 27, 2008 in the Korean Intellectual Property Office, the disclosure of which is incorporated herein by reference in its entirety.

BACKGROUND OF THE INVENTION

1. Field of the Invention

The present invention relates to a mobile terminal and an operating method thereof, and more particularly, to a mobile terminal and an operating method thereof in which a plurality of images respectively corresponding to a plurality of bookmark web pages are stored and are arranged and displayed in such a manner to create a sense of distance.

2. Description of the Related Art

Mobile terminals are portable devices, which can provide users with various services such as a voice calling service, a video calling service, an information input/output service, and a data storage service. As the types of services provided by the mobile terminals diversify, an increasing number of mobile terminals have been equipped for various complicated functions such as capturing photos or moving pictures, playing music files or moving image files, providing game programs, receiving broadcast programs and providing wireless internet services, and have thus evolved into multimedia players.

Various attempts have been made to realize such complicated functions with hardware devices or software programs. Nowadays, users can be provided with various services by websites with their mobile terminals or the mobile terminals can store information regarding the users' favorite or frequently-visited websites by using a bookmark function.

In general, bookmarked websites stored in a mobile terminal may be displayed as a list or in a grid. However, if too many bookmarked websites are displayed as a list, they may not be able to be instantly recognized. Likewise, if too many bookmarked websites are displayed in a grid, the size of images respectively corresponding to the bookmarked websites may be too small to be instantly recognized.

Therefore, it is necessary to develop ways to effectively arrange and display a plurality of bookmarked websites regardless of number to allow a user to conveniently use the bookmark function.

SUMMARY OF THE INVENTION

The present invention provides a mobile terminal and an operating method thereof in which a plurality of images respectively corresponding to a plurality of bookmark web pages are stored and are arranged and displayed in such a manner to create a sense of distance.

According to an aspect of the present invention, there is provided an operating method of a mobile terminal, the operating method including bookmarking a plurality of websites using a touch screen of the mobile terminal, and storing a plurality of images respectively corresponding to the bookmarked plurality of websites in a memory of the mobile terminal; displaying on the touch screen an image array including the stored plurality of images in such a manner to create a sense of distance; and if a drag signal is input via the touch screen, changing at least one of the sizes of the images in the image array, at least one image in the image array, and the arrangement of the images in the image array, according to a direction and distance corresponding to the input drag signal.

According to another aspect of the present invention, there is provided a mobile terminal including a wireless internet module configured to access a plurality of websites; a touch screen configured to display the plurality of websites; and a controller configured to bookmark the plurality of websites accessed by the wireless internet module, store a plurality of images respectively corresponding to the bookmarked plurality of websites, and display an image array including the stored plurality of images in such a manner to create a sense of distance, and change, upon detecting a drag signal input via the touch screen, at least one of the sizes of the images in the image array, at least one image in the image array, and an arrangement of the plurality of images in the image array, according to a direction and distance corresponding to the input drag signal.

According to another aspect of the present invention, there is provided a computer-readable recording medium having recorded thereon a program for executing an operating method of a mobile terminal, the operating method including bookmarking a plurality of websites using a touch screen of the mobile terminal, and storing a plurality of images respectively corresponding to the bookmarked plurality of websites in a memory of the mobile terminal; displaying on the touch screen an image array including the stored plurality of images in such a manner to create a sense of distance; and if a drag signal is input via a touch screen, changing at least one of the sizes of the images in the image array, at least one image in the image array, and an arrangement of the plurality of images in the image array, according to a direction and distance corresponding to the input drag signal.

According to another aspect of the present invention, there is provided a mobile terminal including a wireless internet module configured to access one or more websites; a touch screen configured to display the one or more websites; and a controller configured to bookmark, based on user inputs, selected ones of the one or more websites accessed by the wireless internet module, store images corresponding to the bookmarked websites, and display an image array of the images on the touch screen, wherein the images are perspectively displayed to provide a sense of distance to the image array when displayed on the touch screen.

BRIEF DESCRIPTION OF THE DRAWINGS

The above and other features and advantages of the present invention will become more apparent by describing in detail example embodiments thereof with reference to the attached drawings in which.

DETAILED DESCRIPTION OF THE INVENTION

The embodiments of the present invention will hereinafter be described in detail with reference to the accompanying drawings in which example embodiments of the invention are shown. The term 'mobile terminal', as used herein, may indicate a mobile phone, a smart phone, a laptop book computer, a digital broadcast receiver, a personal digital assistant (PDA), a portable multimedia player (PMP), or a navigation device.

Figure 1:
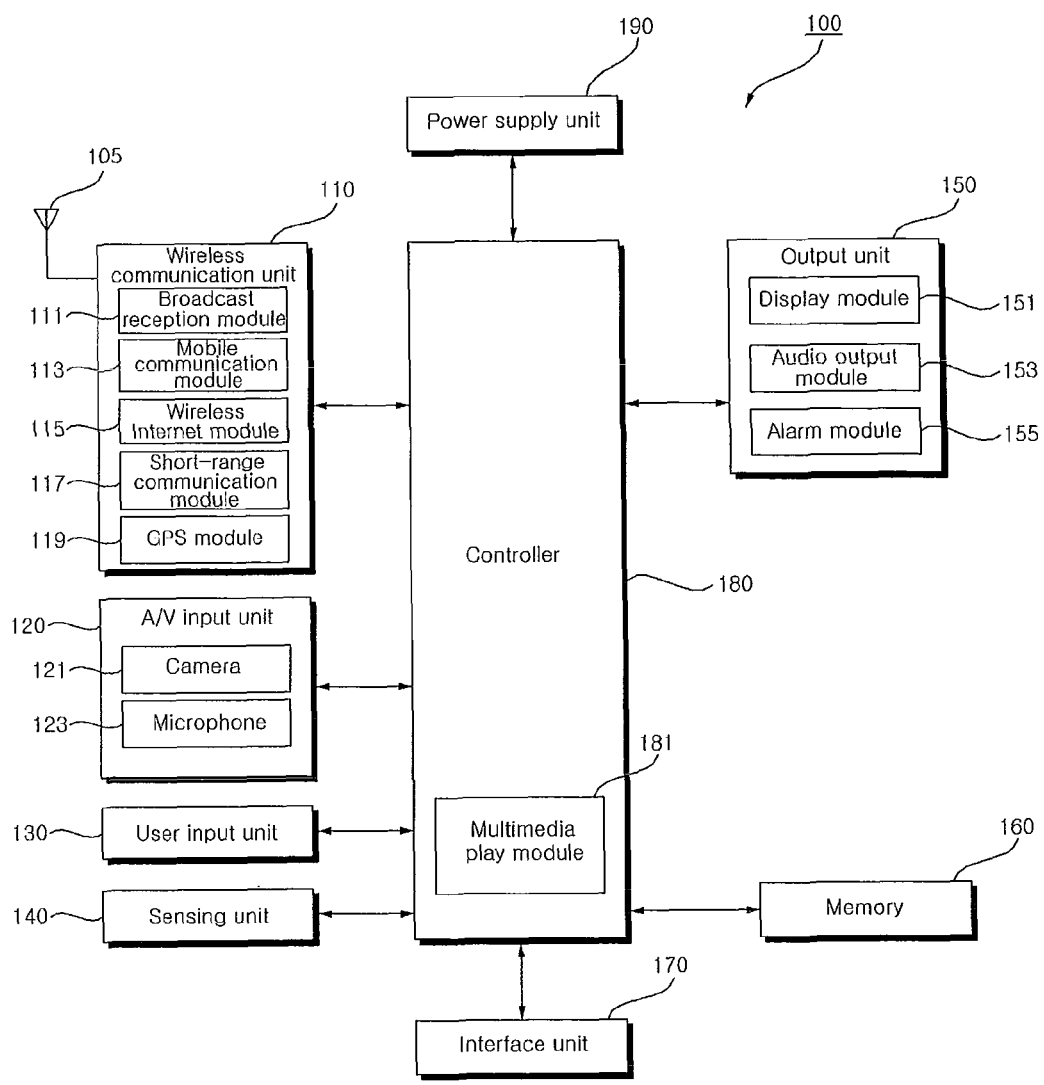
FIG. 1 illustrates a block diagram of a mobile terminal according to an example embodiment of the present invention.

FIG. 1 illustrates a block diagram of a mobile terminal 100 according to an example embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119. The broadcast reception module 111 receives a broadcast signal and/or broadcast-related information from an external broadcast management server (not shown) through a broadcast channel. Examples of the broadcast channel include a satellite channel and a terrestrial channel. The broadcast management server may be a server which generates the broadcast signals and/or the broadcast-related information and transmits the generated broadcast signals and/or the generated broadcast-related information or a server which receives and then transmits previously-generated broadcast signals and/or previously-generated broadcast-related information.

Examples of the broadcast-related information include broadcast channel information, broadcast program information and broadcast service provider information. Examples of the broadcast signal include a TV broadcast signal, a radio broadcast signal, a data broadcast signal, or the combination of a data broadcast signal and either a TV broadcast signal or a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms, for example, electronic program guide (EPG) of digital multimedia broadcasting (DMB) format or electronic service guide (ESG) of digital video broadcast-handheld (DVB-H) format.

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T) formats. In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 transmits wireless signals to or receives wireless signals from at least one of a base station, an external terminal, and a server through the mobile communication network. The wireless signals may include various types of data according to whether the mobile terminal 100 transmits/receives voice call signals, video call signals, or text/multimedia messages. The wireless internet module 115 may be a module for wirelessly accessing the internet. The wireless internet module 115 may be embedded in the mobile terminal 100 or may be installed in an external device. The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee. The GPS module 119 may receive position information from a plurality of GPS satellites.

The A/V input unit 120 may be used to receive audio signals or video signals. The A/V input unit 120 may include a camera 121 and a microphone 123. The camera 121 processes various image frames such as still images or moving images captured by an image sensor during a video call mode or an image capturing mode. The image frames processed by the camera 121 may be displayed by a display module 151. The image frames processed by the camera 121 may be stored in the memory 160 or may be transmitted outside the mobile terminal 100 through the wireless communication unit 110. The mobile terminal 100 may include two or more cameras 121. The microphone 123 receives external sound signals during a call mode, a recording mode, or a voice recognition mode with the use of the microphone 123, and converts the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 generates key input data based on user input for controlling the operation of the mobile terminal 100. The user input unit 130 may be implemented as a keypad, a dome switch, a touch pad (either static pressure or constant electricity), a jog wheel, or a jog switch. In particular, if the user input unit 130 is implemented as a touch pad and forms a mutual layer structure along with the display module 151, the user input unit 130 and the display module 151 may be collectively referred to as a touch screen.

The sensing unit 140 determines a current state of the mobile terminal 100 such as whether the mobile terminal 100 is opened or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened or closed. In addition, the sensing unit 140 may determine whether the mobile terminal 100 is powered by the power supply unit 190 and whether the interface unit 170 is connected to an external device.

The output unit 150 may output audio signals, video signals and alarm signals. The output unit 150 may include the display module 151, an audio output module 153, and an alarm module 155. The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a mutual layer structure and are thus implemented as a touch screen, the display module 151 may be used not only as an output device but also as an input device. If the display module 151 is implemented as the touch screen, the display module 151 may also include a touch screen panel (not shown) and a touch screen panel controller (not shown). The touch screen panel is a transparent panel attached onto the exterior of the mobile terminal 100 and may be connected to an internal bus of the mobile terminal 100. The touch screen panel keeps monitoring whether the touch screen panel is being touched by a user. Once a touch input to the touch screen panel occurs, the touch screen panel transmits a number of signals corresponding to the touch input to the touch screen panel controller. The touch screen panel controller processes the signals transmitted by the touch screen panel, and transmits the processed signals to the control unit 180. Then, the control unit 180 determines whether the touch input has been generated and which part of the touch screen panel has been touched based on the processed signals transmitted by the touch screen panel controller.

As described above, if the display module 151 and the user input unit 130 form a mutual layer structure and are thus implemented as a touch screen, the display module 151 may be used not only as an output device but also as an input device. The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. The alarm module 155 may output a vibration signal upon receiving a call signal or a message. In addition, the alarm module 155 may receive a key signal and may output a vibration signal as feedback to the key signal. Once a vibration signal is output by the alarm module 155, the user may recognize that an event has occurred. A signal for notifying the user of the occurrence of an event may be output by the display module 151 or the audio output module 153.

The memory 160 may store various programs necessary for the operation of the controller 180. In addition, the memory 160 may temporarily store various data such as a phonebook, messages, still images, or moving images. The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card) or a subscriber identification module (SIM)/user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

The controller 180 may control the general operation of the mobile terminal 100. For example, the controller 180 may perform various control operations regarding making/receiving a voice call, transmitting/receiving data, or making/receiving a video call. The controller 180 may include a multimedia play module 181, which plays multimedia data. The multimedia play module 181 may be implemented as a hardware device and may be installed in the controller 180. Alternatively, the multimedia play module 181 may be implemented as a software program. The power supply unit 190 is supplied with power by an external power source or an internal power source and supplies power to other components in the mobile terminal 100.

Figure 2:
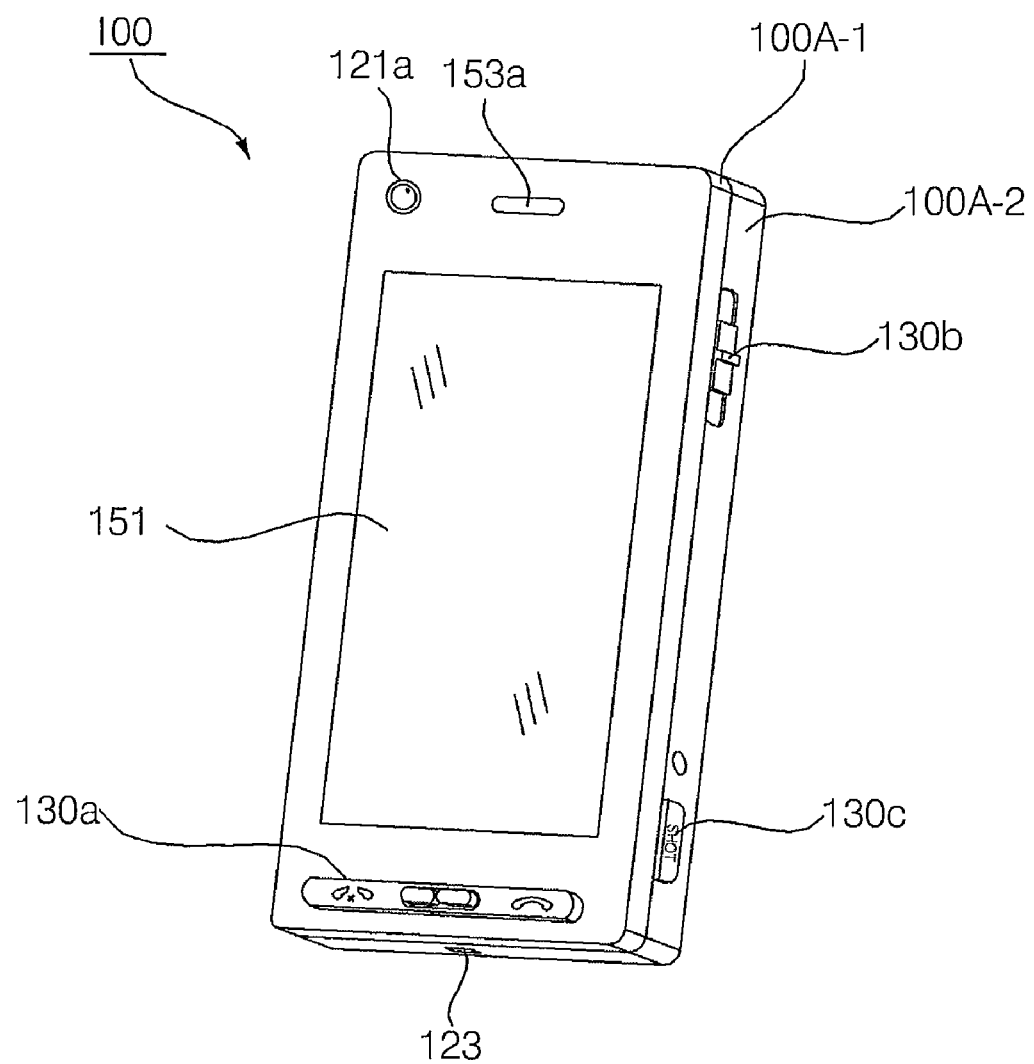
FIG. 2 illustrates a front perspective view of the mobile terminal shown in FIG. 1.

FIG. 2 illustrates a front perspective view of the mobile terminal 100, i.e., a mobile terminal equipped with a display module 151. Referring to FIG. 2, a front case 100A-1 and a rear case 100A-2 may form the exterior of the mobile terminal 100. Various electronic devices may be installed in the empty space between the front case 100A-1 and the rear case 100A-2. The front case 100A-1 and the rear case 100A-2 may be coupled to each other in a folder- or slider-type manner. At least one middle case (not shown) may be additionally provided between the front case 100A-1 and the rear case 100A-2. The front case 100A-1, the rear case 100A-2 and the middle case may be formed of synthetic resin through injection molding. Alternatively, the front case 100A-1, the rear case 100A-2 and the middle case may be formed of a metal material such as stainless steel (STS) or titanium (Ti).

The display module 151, a first audio output unit 153*a*, and a first camera 121*a* may be disposed on the front case 100A-1. Although not shown, in embodiments of the present invention, a second display module may be disposed on the rear case 100A-2. A first user input unit 130*c*, a third user input unit 130*b* and the microphone 123 may be disposed on a side surface of the rear case 100A-2. A second user input unit 130*a* may be disposed on the front case 100A-1 or the rear case 100A-2. In embodiments of the present invention, the second user input unit 130*a* may be buttons or a keypad, for example.

The first display module 151 and/or the second display module may be LCDs or OLEDs which can visualize information. Since a touch pad may be configured to overlap the first display module 151 and/or the second display module to realize a layer structure, the first display module 151 and the second display module may serve as touch screens. Thus, it is possible for a user to input information to the first display module 151 and/or the second display module simply by touching the first display module 151 and/or the second display module.

The first audio output unit 153*a* may be implemented as a receiver or a speaker. The first camera 121*a* may be configured to be suitable for capturing a still or moving image of the user. The microphone 123 may be configured to be suitable for receiving the voice of the user or other sounds.

The first user input unit 130c, the second user input unit 130a and the third user input unit 130b may be collectively referred to as the user input unit 130. The user input unit 130 may be implemented as a dome switch or a touch pad capable of receiving a command or information in response to a push input or a touch input made by the user. Alternatively, the user input unit 130 may be implemented as a jog wheel or a joystick capable of being rotated by the user. The first user input unit 130c may serve as a hot key for activating certain functions of the mobile terminal 100, and the second user input unit 130a may be used to input 'start', 'end' and 'call' commands or to choose an operating mode for the mobile terminal 100.

Figure 3:
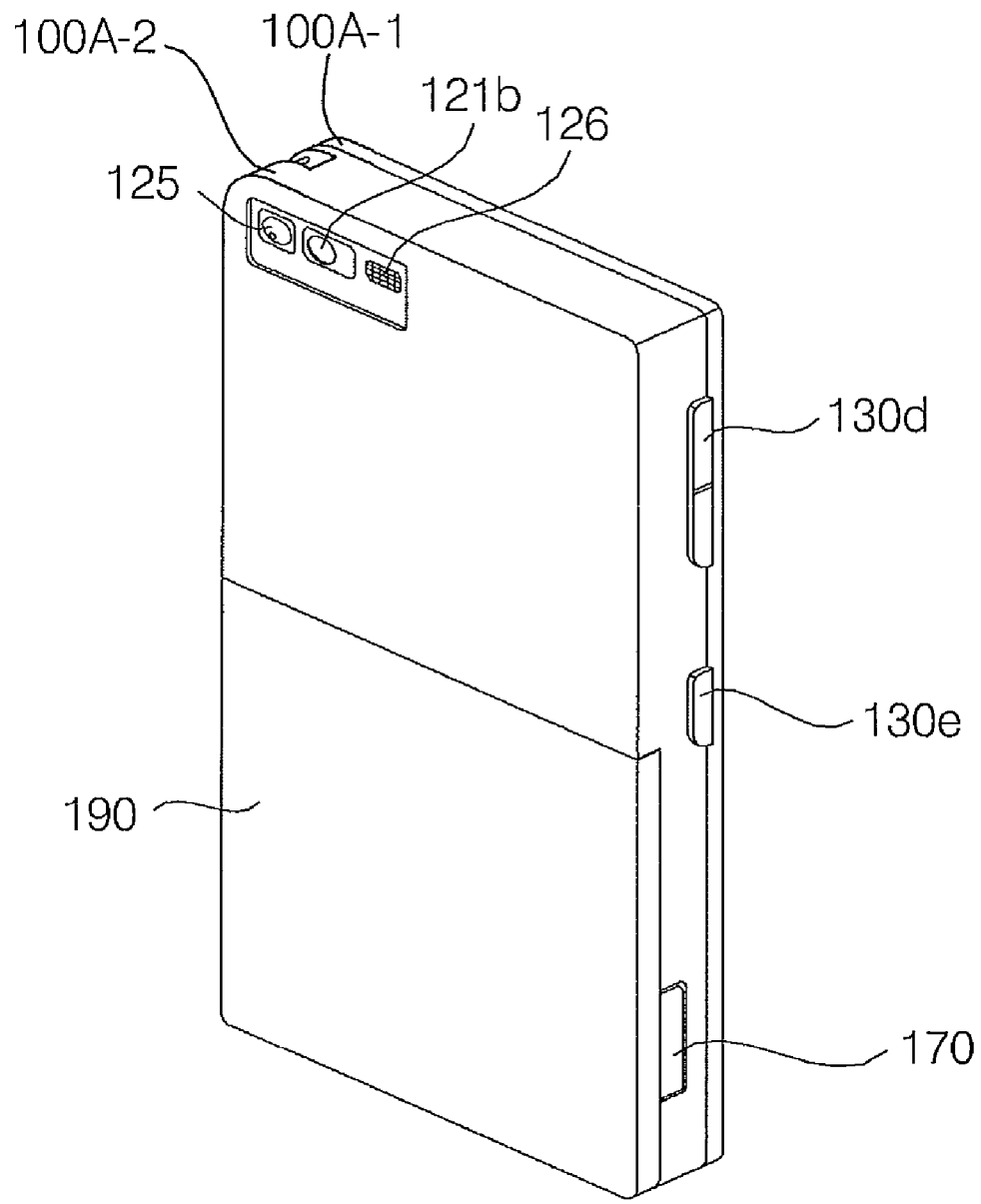
FIG. 3 illustrates a rear perspective view of the mobile terminal shown in FIG. 2.

FIG. 3 illustrates a rear perspective view of the mobile terminal 100. Referring to FIG. 3, a fourth user input unit 130d, a fifth user input unit 130e and the interface unit 170 may be disposed on one side surface of the rear case 100A-2, and a second camera 121b may be disposed at the rear of the rear case 100A-2.

The second camera 121b may have a different photographing direction from that of the first camera 121a shown in FIG. 2. In addition, the resolution of the second camera 121b may be different from the resolution of the first camera 121a. For example, the first camera 121a may be used to capture an image of the user's face and then readily transmit the captured image during a video call. Thus, a low-resolution camera may be used as the first camera 121a. The second camera 121b may be used to capture an image of an ordinary subject. Given that images captured by the second camera 121b generally do not need to be transmitted, a high-resolution camera may be used as the second camera 121b.

A mirror 125 and a camera flash 126 may be disposed near the second camera 121b. The camera flash 126 may illuminate a subject when the second camera 121b captures an image of the subject. The user may look in the mirror 125 for taking a self shot using the second camera 121b. A second audio output module (not shown) may be additionally provided on the rear case 100A-2. The second audio output module may realize a stereo function along with the first audio output module 153a. The second audio output module may also be used during a speaker-phone mode. An antenna (not shown) for receiving a broadcast signal may be disposed on one side surface of the rear case 100A-2. The antenna may be installed so as to be able to be ejected from the rear case 100A-2.

The interface unit 170 may serve as a path for allowing the mobile terminal 100 to exchange data with an external device. For example, the interface unit 170 may be a connection terminal for connecting an earphone to the mobile terminal 100 in a wired or wireless manner, a port for short-range communication or a power supply terminal for supplying operating power to the mobile terminal 100. The interface unit 170 may be a SIM or a UIM or may be a card socket for an exterior-type card such as a memory card for storing data. The power supply unit 190 may be disposed on one side of the rear case 100A-2. The power supply unit 190, for example, a rechargeable battery, may be coupled to the rear case 100A-2 so as to be able to be attached to or detached from the rear case 100A-2.

The second camera 121b is illustrated in FIG. 3 as being disposed on the rear case 100A-2, but the present invention is not restricted to this. The second camera 121b may be optional, if the first camera 121 a can rotate and can thus cover the photographing direction of the second camera 121b.

Figure 4:
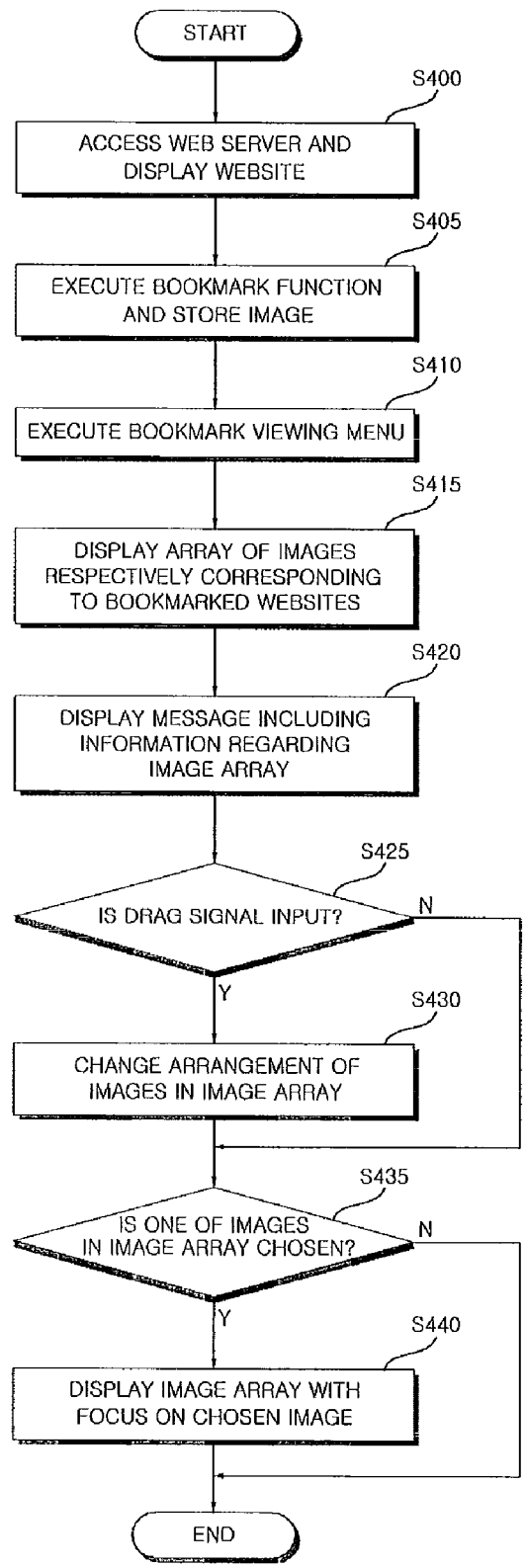
FIG. 4 illustrates a flowchart of an operating method of a mobile terminal, according to an example embodiment of the present invention.

FIG. 4 illustrates a flowchart of an operating method of a mobile terminal, according to an example embodiment of the present invention. Referring to FIG. 4, the controller 180 may access a website with the use of the wireless internet module 115 and may display a web page provided by the website on the display module 151 (S400).

Thereafter, the controller 180 may bookmark the website by executing a bookmark function in response to a user command, and may store an image corresponding to the website (S405). For example, if a sweeping signal for sweeping the web page out of the display module 151 is received, the display of the web page may be terminated, and the website may be bookmarked. As many images as there are bookmarked websites may be stored. The image stored in operation S405 may be a predetermined page of the website. Once the website is bookmarked by executing the bookmark function, a web page of the website may be stored, for example, in the memory 160. An image corresponding to a web page accessed by a link may also be stored, for example, in the memory 160.

Thereafter, the controller 180 may execute a bookmark view function in order to view a number of bookmarked websites (S410). The bookmark view function may be provided by the display module 151 during the execution of the bookmark function in operation S405, for example, through a bookmark viewing menu. As a result of the execution of the bookmark view function, the controller 180 may display an array of a plurality of images respectively corresponding to a plurality of bookmarked websites, including the image stored in operation S405, in such a manner to create a sense of distance (S415). More specifically, the controller 180 may display the images respectively corresponding to the bookmarked websites in different sizes so as to create a sense of distance. In embodiments of the present invention, the controller 180 may display the images respectively corresponding to the bookmarked websites to provide a perspective view thereof on the display module 151.

The images in the image array displayed in operation S415 may be arranged in order of bookmarking. For example, the images in the image array displayed in operation S415 may be arranged in the order (or reverse order) in which the websites have been bookmarked. If the images in the image array displayed in operation S415 are arranged in the order in which the websites have been bookmarked, whichever of the websites has been least recently bookmarked may be displayed in the largest size. Alternatively, the images in the image array displayed in operation S415 may be arranged in order of the number of visits to the websites.

The images in the image array displayed in operation S415 may not necessarily have to be arranged in a row. That is, the images in the image array displayed in operation S415 may be arranged in the shape of a tree with two or more branches. The branches may represent different links to different websites or different dates of the bookmarking.

An image array may not be able to be displayed as a whole due to a limited size of the display module 151. In such a case, the controller 180 may display a message including information regarding the arrangement of the images in the image array displayed in operation S415 (S420). More specifically, the controller 180 may display a message describing the relative positions of the images in the image array displayed in operation S415 or a map showing the arrangement of the images in the image array displayed in operation S415. Therefore, even if the image array displayed in operation S415 includes too may images to be displayed as a whole on the display module 151 due to the limited size of the display module 151, the user may easily determine how the images in the image array displayed in operation S415 are arranged by the displayed message.

More specifically, the message displayed in operation S420 may describe a path to each of the images in the image array displayed in operation S415 according to direction and/or distance, for example, from a reference point. For example, the message may state, "This image is the tenth one from the right of the fifth image," "This image is the second one from the left of Taegon's blog that is 100 m away from the first image," or "This image is the thirtieth one southeast of Taegon's blog." Therefore, the user may be able to easily move from one bookmarked website to another bookmarked website using the message displayed in operation S420.

Thereafter, the controller 180 may determine whether a drag signal has been input via the display module 151 (S425). If it is determined in operation S425 that no drag signal has been input to the display module 151, the operating method may proceed to operation S435. On the other hand, if it is determined in operation S425 that a drag signal has been input to the display module 151, the controller 180 may change the arrangement of the images in the image array displayed in operation S415 in response to the input drag signal (S430). More specifically, the controller 180 may change the images in the image array displayed in operation S415 and the sizes and shapes of the corresponding images according to a direction and a distance corresponding to the input drag signal.

For example, the image array displayed in operation S415 may be moved along the direction corresponding to the input drag signal. Alternatively, whichever of the images in the image array displayed in operation S415 is displayed in the largest size may be deleted, and at least one or each of the images in the image array displayed in operation S415 may be enlarged in response to the input drag signal. Still alternatively, if the image array displayed in operation S415 includes too many images to be displayed as a whole on the display module 151, a number of images in the corresponding image array, other than those currently being displayed on the display module 151, may be newly displayed in response to the input drag signal. Still alternatively, the arrangement of the images in the image array displayed in operation S415 may be changed in response to the input drag signal. Still alternatively, the number of images that can be displayed at the same time on the display module 151 may be changed in response to the input drag signal.

Thereafter, the controller 180 may determine whether one of the images in the image array displayed in operation S415 has been chosen (S435). If it is determined in operation S435 that one of the images in the image array displayed in operation S415 has been chosen, the controller 180 may display the chosen image on the display module 151 in the largest size, and may display the corresponding image array with focus on the chosen image (S440). For example, if the images in the image array displayed in operation S415 are arranged in an order in which the websites have been bookmarked, and a fifth image in the corresponding image array is chosen, the chosen image and all subsequent images in the corresponding image array may be displayed in such a manner to create a sense of distance when viewed on the display module 151. If it is determined in operation S435 that none of the images in the image array displayed in operation S415 have been chosen, the operating method may end.

Figure 5:
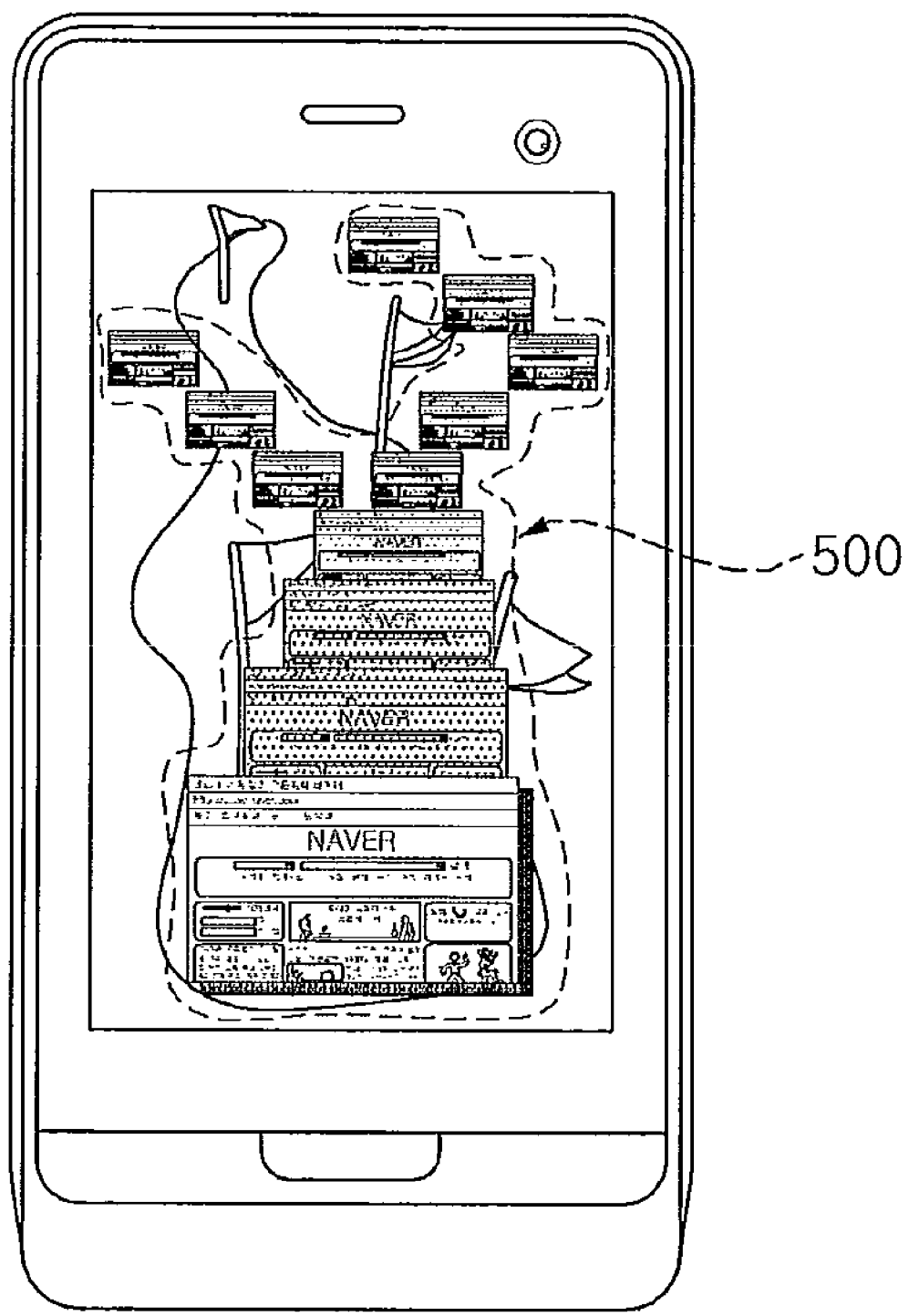
FIGS. 5 through 9C illustrate diagrams for explaining the operating method shown in FIG. 4.

FIGS. 5 through 9C illustrate diagrams for explaining the operating method shown in FIG. 4. Referring to FIG. 5, when a bookmark viewing menu is executed, an image array 500 including a plurality of images respectively corresponding to a plurality of bookmarked websites is displayed. The images in the image array 500 may be displayed in different sizes so as to create a sense of distance, for example, with the larger sized images being displayed in a foreground of a screen of the display module 151 and the smaller sized images being displayed in a background of the screen of the display module 151. In other words, the images in the image array 500 may be displayed so that the largest sized image to the smallest sized image are displayed in descending order from the foreground of the screen to the background of the screen of the display module 151. Alternatively, the image array 500 may be tree-shaped with two branches. With respect to branches, the images in the image array 500 may be arranged to also create the sense of distance. Additionally, in embodiments of the present invention, the images in the image array 500 may be displayed as a multilayered stacking of the images, whose sizes are the same, and/or in descending or ascending order. Yet further, the images in the image array 500 may be displayed as being completely overlapped with each other, partially overlapped with each other, or not overlapped at all.

Figure 6A:
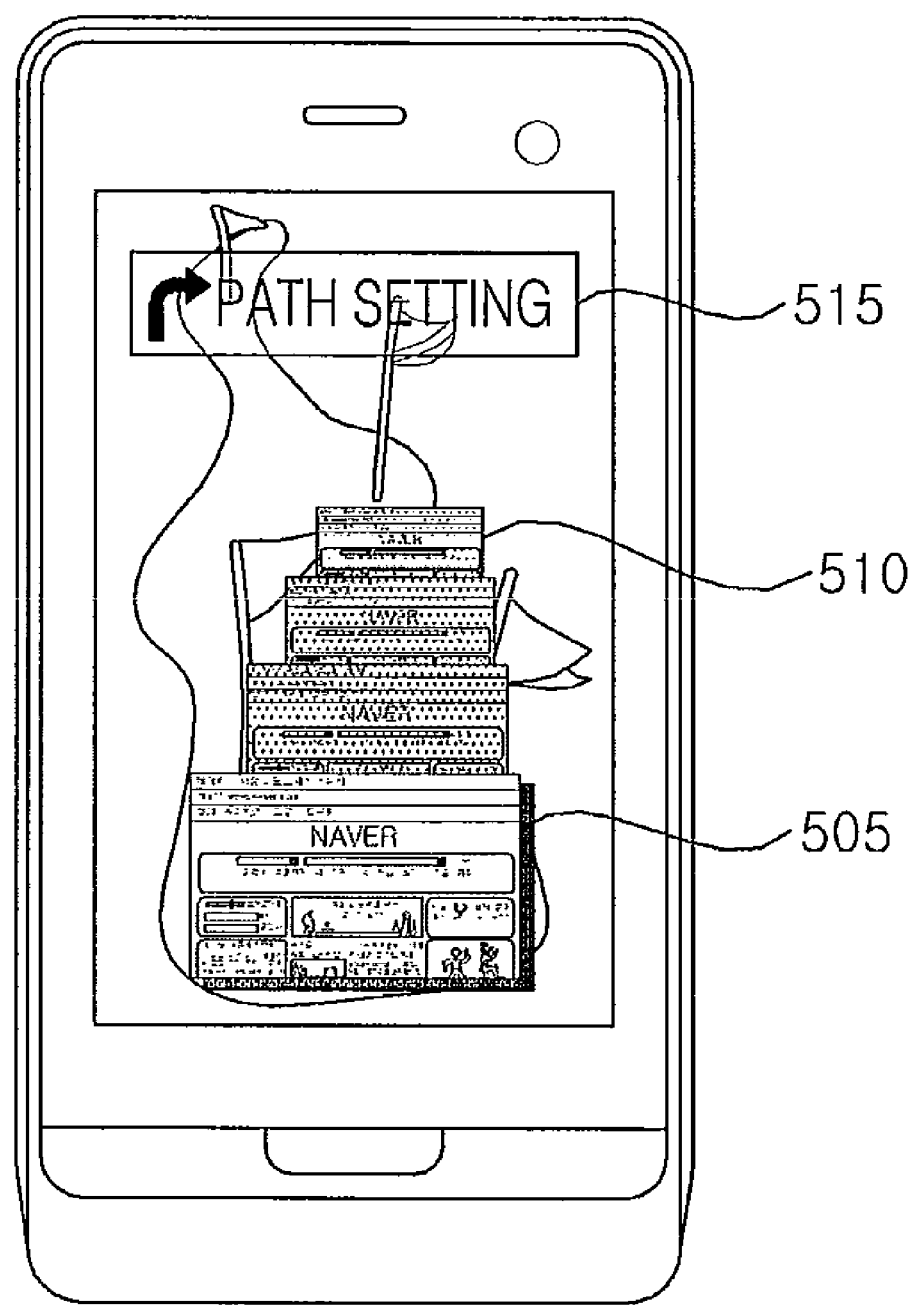
Figure 6B:
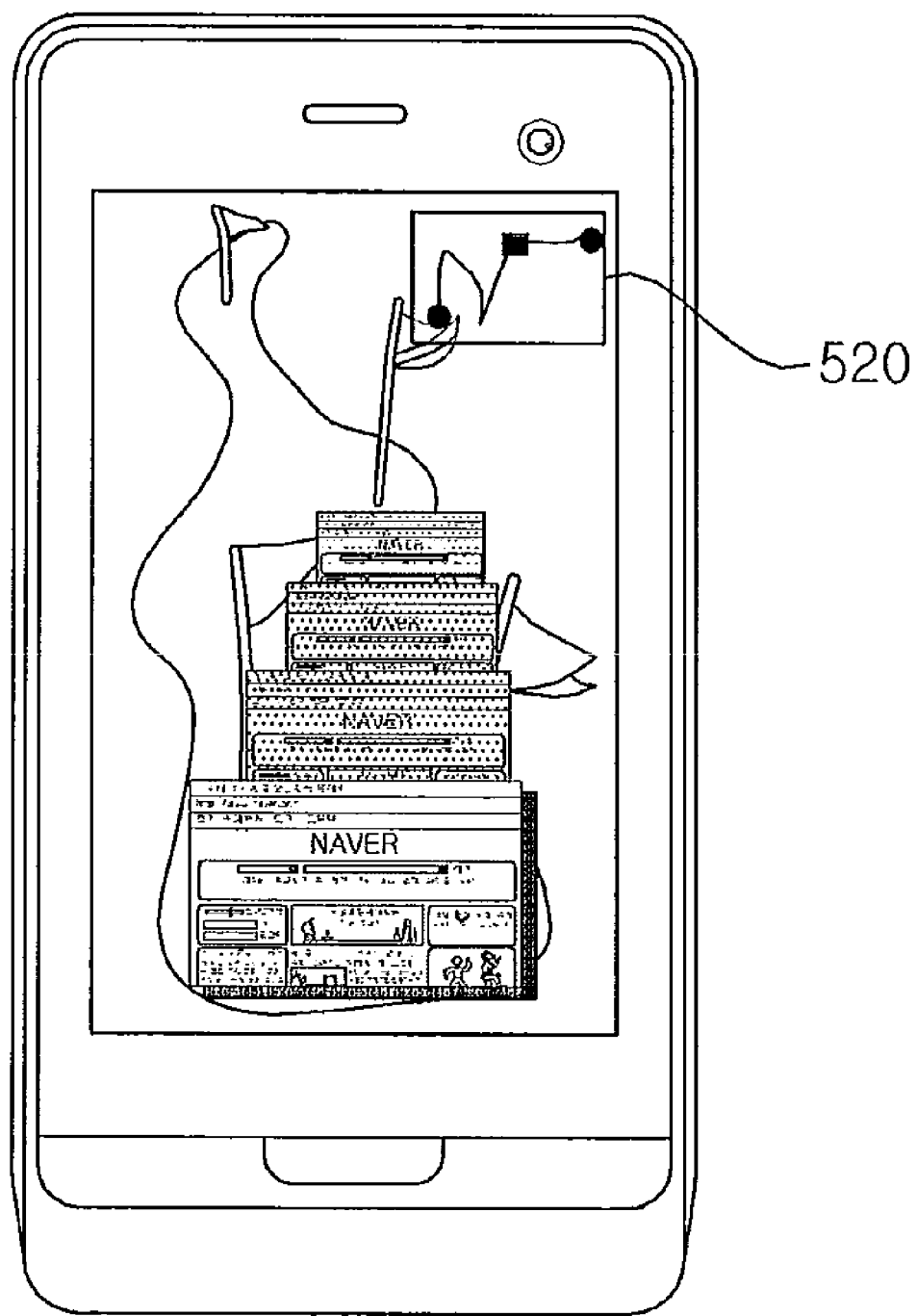

Referring to FIG. 6A, if a plurality of images respectively corresponding to a plurality of bookmarked websites are arranged in the order in which the websites have been bookmarked, the image corresponding to whichever of the websites has been most recently bookmarked, i.e., an image 505, may be displayed as being largest in size, and the image corresponding to whichever of the websites has been least recently bookmarked, i.e., an image 510, may be displayed in the smallest size, or vice versa. In this manner, a sense of distance may be created. An image array may be displayed along with a message 515 indicating the path of the image array. Alternatively, referring to FIG. 6B, a map 520 indicating how the images in the image array are arranged may be displayed with markings to represent the images. These markings may be a symbol, an icon, a shape, a letter, text, a color, or other visual representations. Accordingly, the user may be able to easily determine the relative positions of the images in the image array even when the image array includes too many images to be displayed as a whole on the display module 151.

Figure 7A:
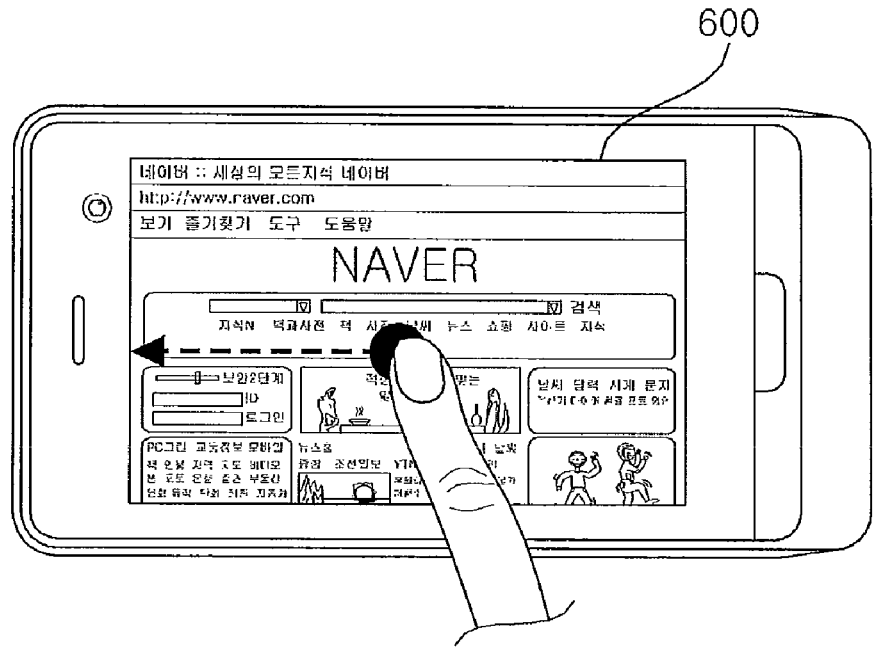
Figure 7B:
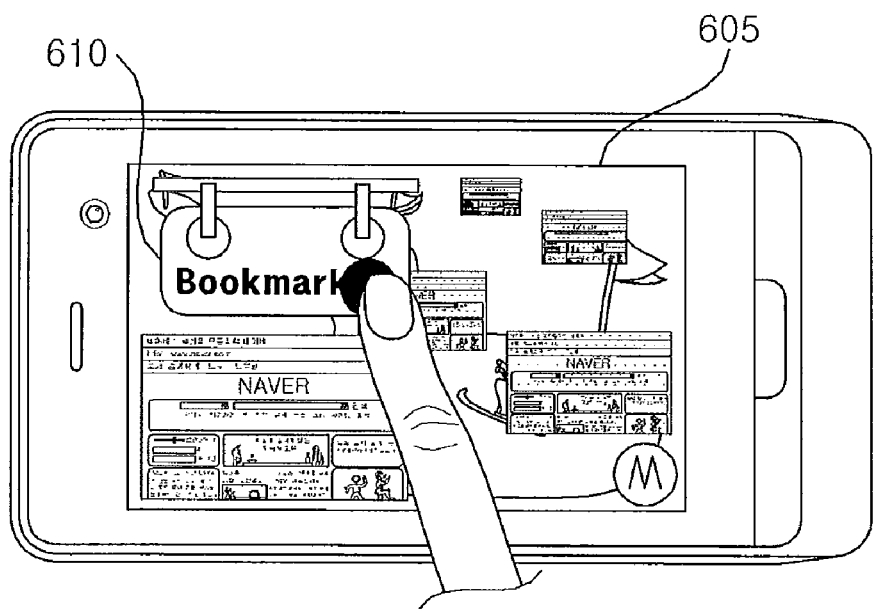

Referring to FIG. 7A, a web page (or website) 600 provided by a predetermined website may be displayed in response to a user command. Thereafter, if a sweeping signal is detected for the web page 600 (as represented by the leftward arrow), a bookmark function may be executed. Thus, referring to FIG. 7B, an image array 605 including a plurality of images respectively corresponding to a plurality of previously-bookmarked websites may be displayed, and a bookmark execution menu 610 may be displayed. In FIG. 7A, the web page 600 is shown as one that is in Korean. However, in embodiments of the present invention, any language web page may be bookmarked.

Figure 8A:
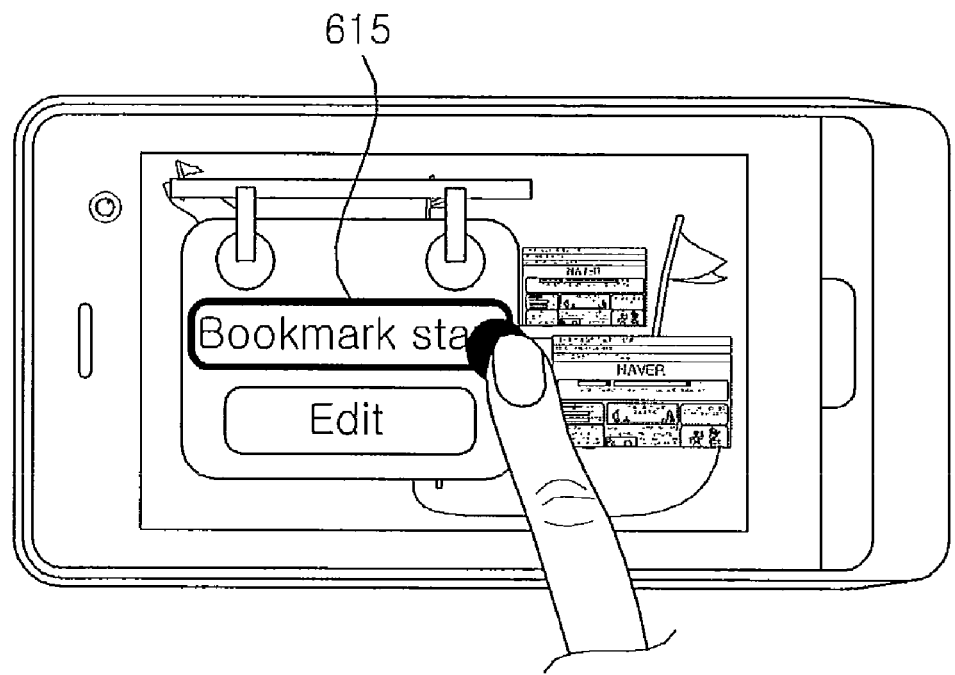
Figure 8B:
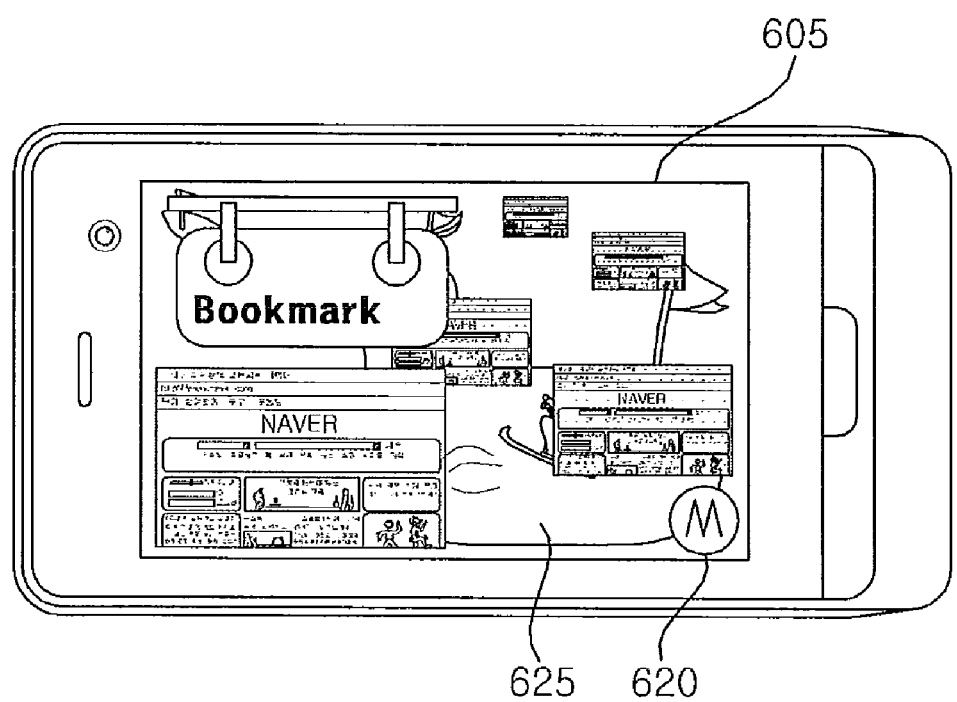
Figure 8C:
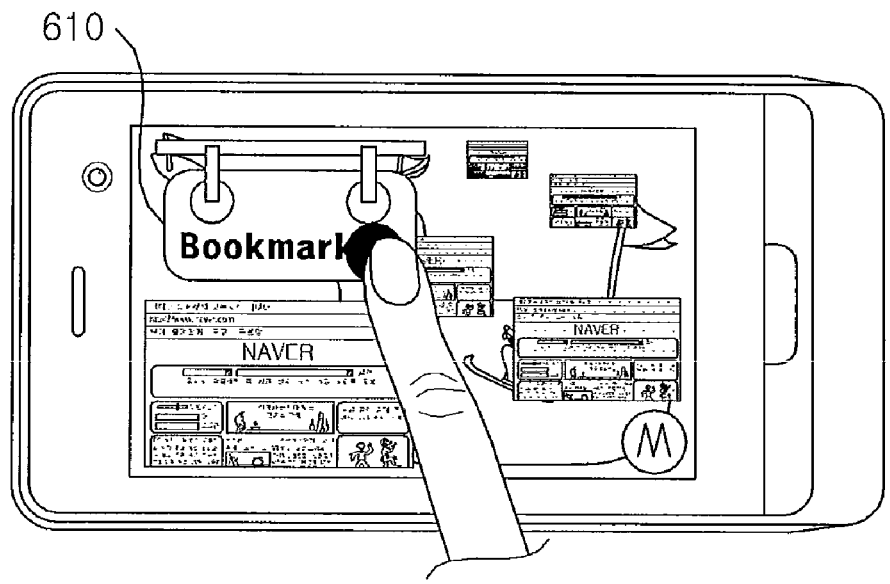
Figure 9A:
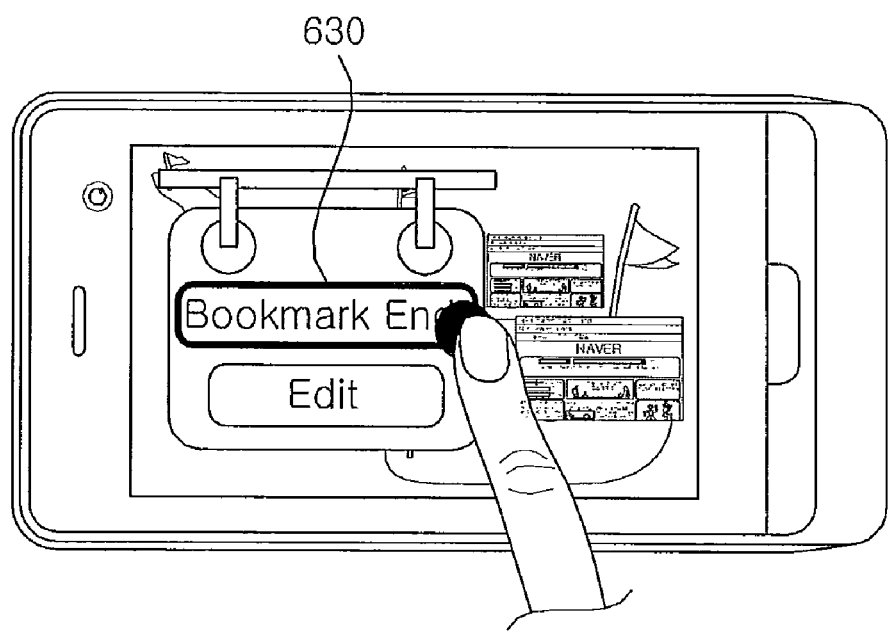
Figure 9B:
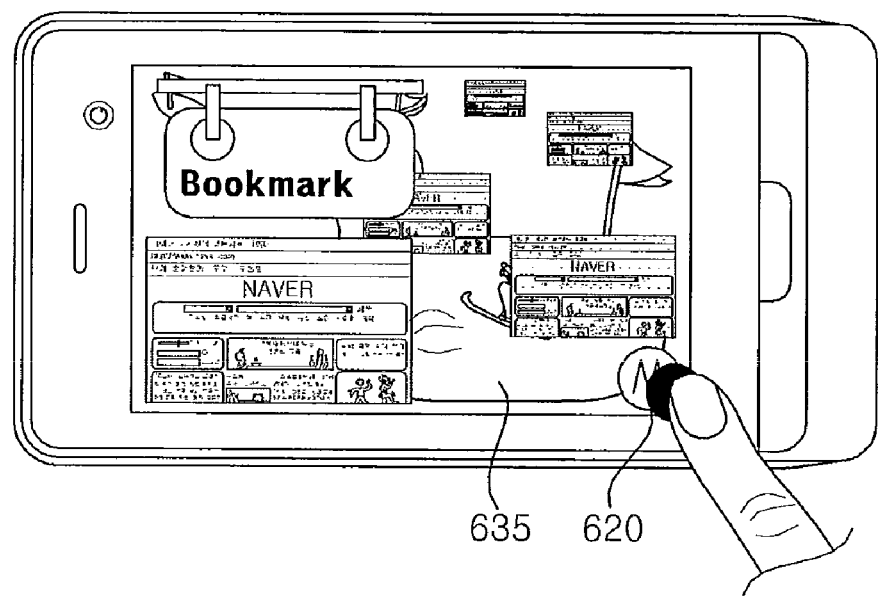
Figure 9C:
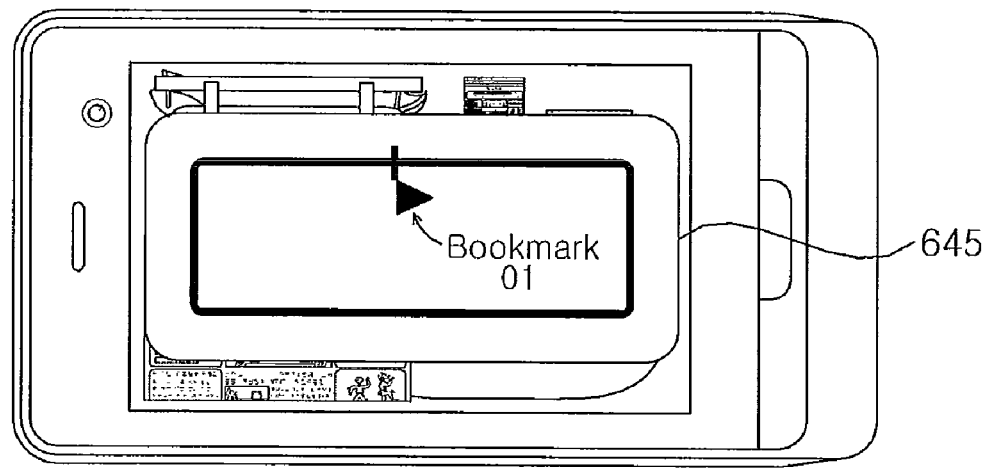

If the user chooses the bookmark execution menu 610, a bookmark start button 615 may be displayed, as shown in FIG. 8A. If the user chooses the bookmark start button 615, an icon 620 indicating that the bookmark function is being executed may be displayed, and an image 625 corresponding to the predetermined website may be displayed, as shown in FIG. 8B. Thereafter, if the user chooses the bookmark execution menu 610 again, a bookmark end button 630 may be displayed, as shown in FIG. 9A. If the user chooses the bookmark end button 630, the storing of the image 625 may be terminated, and an image array 635 including the image 625 may be displayed, as shown in FIG. 9B. If the user chooses the bookmark function icon 620, or a separate map icon (not shown), a map 645 indicating the relative position of the image 625 in the image array 635 may be displayed, as shown in FIG. 9C. In the embodiments of the present invention, the addition of each image to the image array 635 may be shown or displayed in real time as websites are bookmarked. In the embodiments of the present invention, the bookmark function may be executed by additional or alternative ways. For example, the bookmark function may be executed, or the bookmark execution menu 610 may be displayed, by touching an icon or a predetermined portion of the screen of the display module 151, by a button or a key of the mobile terminal 100 and/or by shaking or movement of the mobile terminal 100. The mobile terminal according to the present invention and the method of controlling the operation of a mobile terminal according to the present invention are not restricted to the example embodiments set forth herein. Therefore, variations and combinations of the example embodiments set forth herein may fall within the scope of the present invention.

The embodiments of the present invention can be realized as computer-readable code written on a computer-readable recording medium, which when executed by a controller, causes E the controller to implement the method of controlling the operation of a mobile terminal. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

While the present invention has been particularly shown and described with reference to example embodiments thereof, it will be understood by those of ordinary skill in the art that various changes in form and details may be made therein without departing from the spirit and scope of the present invention as defined by the following claims.

What is claimed is:

1. An operating method of a mobile terminal, the operating method comprising:
bookmarking a plurality of websites using a touch screen of the mobile terminal, and storing a plurality of images respectively corresponding to the bookmarked plurality of websites in a memory of the mobile terminal;
displaying on the touch screen an image array including the stored plurality of images in such a manner to create a sense of distance when a bookmark viewing menu is selected, wherein the image array is displayed in a shape of a tree classified by at least two branches according to attributes of the plurality of images, the attributes comprising date information of bookmarking the plurality of websites and route information of accessing the plurality of websites;
displaying, a message indicating how the plurality of images in the image array is arranged, along with the image array when the image array cannot be displayed as a whole on the touch screen, wherein the message comprises text-based path information that describes a relative position of a specific image corresponding to a specific website of the bookmarked websites in the image array, the text-based path information comprising at least one of direction information, distance information and order information from a reference point of the image array to the specific image; and
if a drag signal is input via the touch screen, changing at least one of the sizes of the images in the image array, at least one image in the image array, and an arrangement of the images in the image array, according to at least one of direction and distance corresponding to the input drag signal,
wherein the bookmarking of the plurality of websites comprises:
displaying a web page provided by the respective website on the touch screen;
displaying a bookmark execution menu on the touch screen if a sweeping signal for the web page displayed on the touch screen is detected;
executing a bookmark function via a manipulation of the bookmark execution menu; and
displaying, on the touch screen, an icon indicating that the bookmark function is being currently executed.

2. The operating method of claim 1, wherein the plurality of images in the image array are arranged in an order in which the plurality of websites have been bookmarked.

3. The operating method of claim 1, wherein the plurality of images in the image array are arranged in order of a respective number of visits to the plurality of websites.

4. The operating method of claim 1, wherein only some of the plurality of images in the image array are displayed at the same time on the touch screen.

5. The operating method of claim 1, further comprising, if one of the plurality of images in the image array is chosen, displaying the chosen image of the image array in a largest size and displaying the image array with a focus on the chosen image.

6. The operating method of claim 1, wherein the message includes a map showing how all images of the image array are arranged as a whole, the map comprising a plurality of markings for representing images of the currently displayed image array.

7. A mobile terminal, comprising:
a wireless internet module configured to access a plurality of websites;
a touch screen configured to display the plurality of websites; and
a controller configured to:
bookmark the plurality of websites accessed by the wireless internet module,
store a plurality of images respectively corresponding to the bookmarked plurality of websites,
display an image array including the stored plurality of images in such a manner to create a sense of distance when a bookmark viewing menu is selected, wherein the image array is displayed in a shape of a tree classified by at least two branches according to attributes of the plurality of images, the attributes comprising date information of bookmarking the plurality of websites and route information of accessing the plurality of websites,
display, a message indicating how the plurality of images in the image array is arranged, along with the image array when the image array cannot be displayed as a whole on the touch screen, wherein the message comprises text-based path information that describes a relative position of a specific image corresponding to a specific website of the bookmarked websites in the image array, the text-based path information comprising at least one of direction information, distance information and order information from a reference point of the image array to the specific image; and
change, upon detecting a drag signal input via the touch screen, at least one of the sizes of the plurality of images in the image array, at least one image in the image array, and an arrangement of the plurality of images in the image array, according to at least one of direction and distance corresponding to the input drag signal, wherein the controller is further configured to:

display a web page provided by the respective website on the touch screen;

display a bookmark execution menu on the touch screen if a sweeping signal for the web page displayed on the touch screen is detected;

execute a bookmark function via a manipulation of the bookmark execution menu; and display, on the touch screen, an icon indicating that the bookmark function is being currently executed.

8. The mobile terminal of claim 7, wherein the controller arranges the plurality of images in the image array in an order in which the plurality of websites have been bookmarked.

9. The mobile terminal of claim 7, wherein the controller arranges the plurality of images in the image array in order of a respective number of visits to the plurality of websites.

10. The mobile terminal of claim 7, wherein, if one of the plurality of images in the image array is chosen, the controller displays the chosen image of the image array in a largest size and displays the image array with a focus on the chosen image.

11. The mobile terminal of claim 7, wherein the message includes a map showing how all images of the image array are arranged as a whole, the map comprising a plurality of markings for representing images of the currently displayed image array.

12. A mobile terminal, comprising:

a wireless internet module configured to access one or more websites;

a touch screen configured to display the one or more websites; and a controller configured to:

bookmark, based on user inputs, selected ones of the one or more websites accessed by the wireless internet module, store images corresponding to the bookmarked websites, display an image array including the stored images in such a manner to create a sense of distance when a bookmark viewing menu is selected, wherein the image array is displayed in a shape of a tree classified by at least two branches according to attributes of the images, the attributes comprising date information of bookmarking the one or more websites, and display, a message indicating how the images in the image array is arranged, along with the image array when the image array cannot be displayed as a whole on the touch screen, wherein the message comprises text-based path information that describes a relative position of a specific image corresponding to a specific website of the bookmarked websites in the image array, the text-based path information comprising at least one of direction information, distance information and order information from a reference point of the image array to the specific image; and change, upon detecting a drag signal input via the touch screen, at least one of the sizes of the images in the image array, at least one image in the image array, and an arrangement of the images in the image array, according to at least one of direction and distance corresponding to the input drag signal, wherein the images are perspectively displayed to provide a sense of distance to the image array when displayed on the touch screen, and wherein the controller is further configured to:

display a web page provided by the respective website on the touch screen;

display a bookmark execution menu on the touch screen if a sweeping signal for the web page displayed on the touch screen is detected;

execute a bookmark function via a manipulation of the bookmark execution menu; and display, on the touch screen, an icon indicating that the bookmark function is being currently executed.

13. The mobile terminal of claim 12, wherein the controller changes, upon detecting a drag signal input via the touch screen, at least one of the images of the image array, sizes of the images of the image array, and an arrangement of the images of the image array, according to a direction and distance corresponding to the input drag signal.

14. The mobile terminal of claim 12, wherein the images are displayed with the largest sized image to the smallest sized image being arranged in descending order from a foreground of the touch screen to a background of touch screen, the largest sized image being of the most recently bookmarked website and the smallest sized image being of the least recently bookmarked website.

15. The operating method of claim 1, wherein the image array and the message are displayed on the touch screen at the same time.

16. The mobile terminal of claim 7, wherein the image array and the message are displayed on the touch screen at the same time.

17. The operating method of claim 1, further comprising:

displaying a bookmark function icon on the touch screen; and displaying a map indicating the relative position of the specific image corresponding to the specific website of the bookmarked websites in the image array if the bookmark function icon is selected.

18. The mobile terminal of claim 7, wherein the controller is further configured to:

display a bookmark function icon on the touch screen, and display a map indicating the relative position of the specific image corresponding to the specific website of the bookmarked websites in the image array if the bookmark function icon is selected.

* * * * *